(12) United States Patent
Lecordix et al.

(10) Patent No.: US 6,256,980 B1
(45) Date of Patent: Jul. 10, 2001

(54) THRUST REVERSER WITH TURNING VANES CAPABLE OF BEING SUPERPOSED

(75) Inventors: Jean-Loïc Lecordix, Vaux le Penil; Laurent Claude Jacques Schreiber, Soisy sur Seine, both of (FR)

(73) Assignee: Societe Nationale d'Etude et de Construction de Moteurs d'Aviation (SNECMA) (FR)

(*) Notice: Subject to any disclaimer, the term of this patent is extended or adjusted under 35 U.S.C. 154(b) by 0 days.

(21) Appl. No.: 09/581,542

(22) PCT Filed: Nov. 25, 1999

(86) PCT No.: PCT/FR99/02904

§ 371 Date: Jul. 11, 2000

§ 102(e) Date: Jul. 11, 2000

(87) PCT Pub. No.: WO00/31401

PCT Pub. Date: Jun. 2, 2000

(30) Foreign Application Priority Data

Nov. 26, 1998 (FR) .................................................. 98 14885

(51) Int. Cl.$^7$ ........................................................ F02K 1/72
(52) U.S. Cl. ...................... 60/226.2; 60/230; 244/110 B; 239/265.29; 239/265.31
(58) Field of Search .................................. 60/226.2, 229, 60/230; 244/110 B; 239/265.27, 265.29, 265.31

(56) References Cited

U.S. PATENT DOCUMENTS 3,248,878 * 5/1966 Clark et al. .............................. 60/229
3,330,505 * 7/1967 Sedlmaier .......................... 244/110 B
3,500,645    3/1970 Hom .
3,581,841    6/1971 Raynes .
3,655,150 * 4/1972 Haberkorn et al. ............... 244/110 B
3,981,451 * 9/1976 Prior et al. ........................... 60/226.2

FOREIGN PATENT DOCUMENTS 0 109 219 A2   5/1984 (EP) .
0 809 010 A1  11/1997 (EP) .

* cited by examiner

*Primary Examiner*—Ted Kim
(74) *Attorney, Agent, or Firm*—Bacon & Thomas PLLC

(57) ABSTRACT

A thrust reverser for a turbofan jet engine having a stationary structure defining an upstream part of a fan cowling and an axially displaceable, annular structure located downstream of the stationary structure, wherein the inner surface of the fan cowling is spaced from an outer surface of an engine cowling to form an annular duct. A plurality of flaps form a portion of the inner surface of the fan cowling during a forward thrust position, and in a reverse thrust position, the flaps pivotably rotate about a stationary pivot so that their first edges are adjacent with the outer surface of the engine cowling to block the annular duct. A plurality of thrust reverser baffle portions are covered by the flaps during the forward thrust position, and during the reverse thrust position, the thrust reverser baffle portions cover a passageway in the fan cowling between the stationary structure and the displaceable structure. The plurality of thrust reverser baffle portions are radially offset and substantially parallel, and comprise a stationary baffle portion and at least one movable baffle portion. In a reverse thrust position, the movable baffle portions are displaced so that the plurality of thrust reverser baffles are longitudinally juxtaposed, redirecting the deflected gas flow.

5 Claims, 3 Drawing Sheets

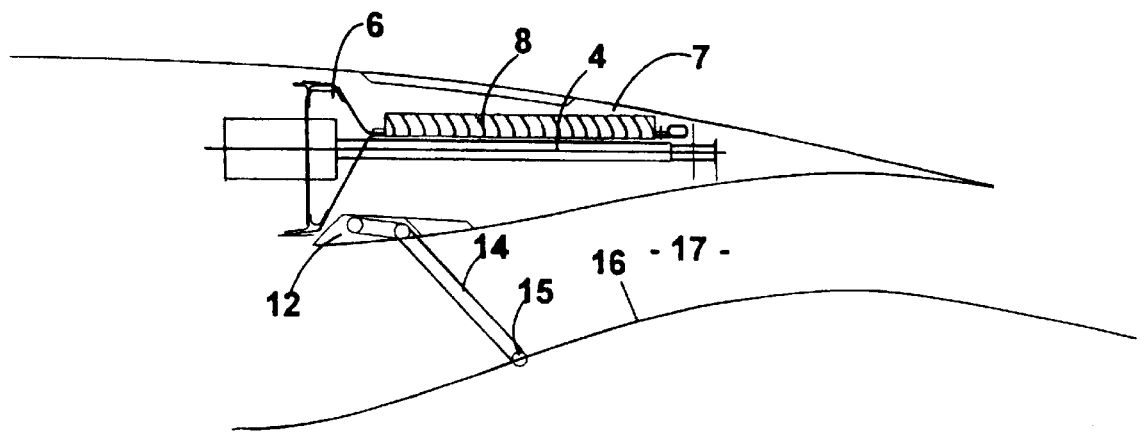
Fig : 1
PRIOR ART
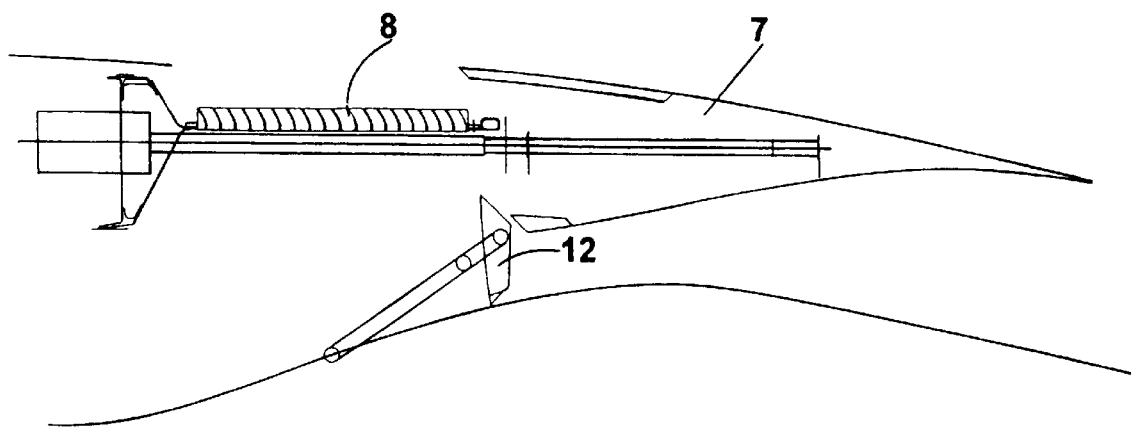
Fig : 2
PRIOR ART

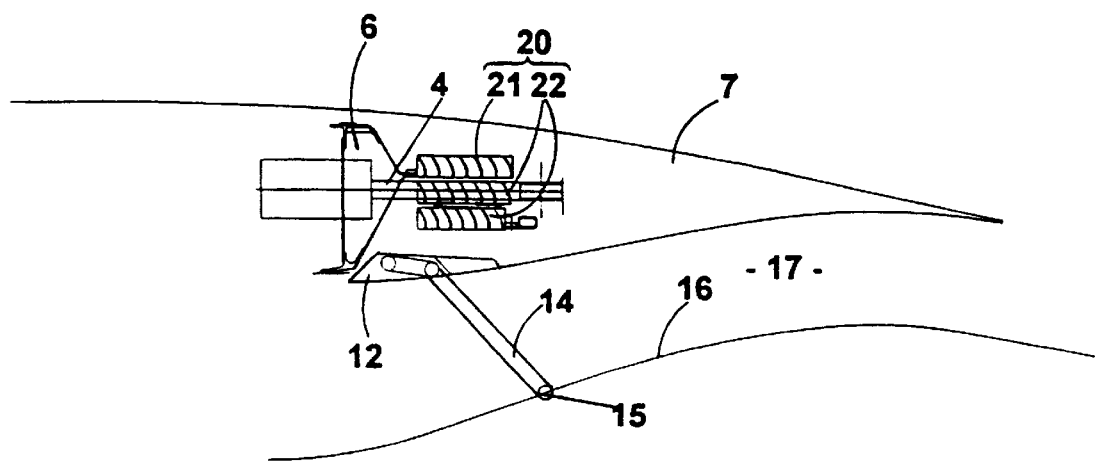
Fig : 3
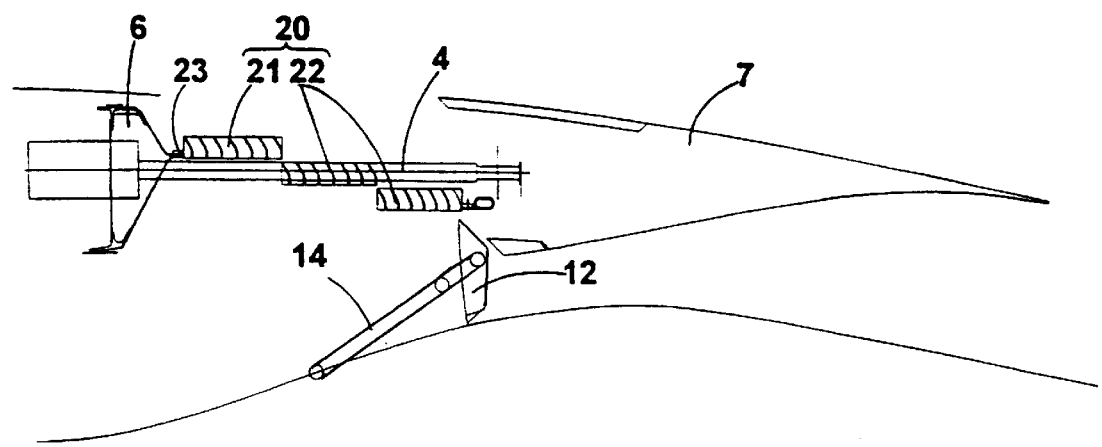
Fig : 4

THRUST REVERSER WITH TURNING VANES CAPABLE OF BEING SUPERPOSED

BACKGROUND OF THE INVENTION

1. Field of the Invention

The present invention relates to a thrust reverser for a bypass turbojet-engine, and more particularly, a thrust reverser having rotatable pivoting flaps closing an annular gas flow duct and stationary baffle portions radially offset with movable baffle portions redirecting a gas flow.

2. Related Art

Turbofan-type turbojet engines typically comprise a turbojet engine encased in a cowling wherein the engine drives a fan usually located at the front portion of the engine. The fan blades are enclosed in a fan cowling so that at least a portion of the is fan cowling is spaced from the engine cowling to define a generally annular gas flow duct. The annular gas flow duct channels the air impelled by the rotation of the fans.

As shown in FIGS. 1 and 2, it is known to position a thrust reverser so as to act against the gases flowing through the annular duct. FIG. 1 illustrates a thrust reverser in a forward thrust position having a displaceable structure (7) with an inner surface spaced from an outer surface (16) of an engine cowling so as to form an annular gas flow duct (17). In the forward thrust position, a flap (12) covers a plurality of thrust reverser baffles (20) housed within the displaceable structure (7) by forming a portion of the inner surface of the displaceable structure (7). FIG. 2 illustrates the thrust reverser in FIG. 1 in a reverse thrust position wherein the displaceable structure (7) is axially displaced downstream to clear a passageway in the fan cowling for the flow deflected between the stationary structure (6) and an upstream edge of the displaceable structure (7). The flap (12) rotates so that one edge is adjacent with the outer surface (16) of the engine cowling to block the annular duct (17) and the flow is outwardly deflected from the passageway by the thrust reverser baffles (20).

European patent 0,109,219 A and U.S. Pat. No. 3,500,645 disclose typical designs using thrust reverser baffles. In these instances, baffles are rigidly connected to a non-translatable part of the fan cowling so that in a reverse thrust mode, a pivotable flap redirects the gas in the annular duct and the baffles effectively divert the exhausted gas through a passageway in the fan cowling. However, in such designs, the integration of thrust reverser baffles dictate the length of the displaceable structure which may increase the weight and require increased storage space in the jet engine cowling.

SUMMARY OF THE INVENTION

A thrust reverser is disclosed for a turbofan jet engine having a stationary structure defining an upstream part of a fan cowling and an axially displaceable, annular structure located downstream of the stationary structure. The displaceable structure forms a downstream external part of the fan cowling and a downstream part of a radial inner surface spaced from an outer surface of an engine cowling so as to form an annular gas flow duct. During a reverse thrust position, the displaceable structure is axially displaced to the rear to clear a passageway in the fan cowling for the flow deflected between the stationary structure and an upstream edge of the displaceable structure. A plurality of flaps form a portion of the inner surface of the displaceable structure during a forward thrust position, and in reverse thrust position, the flaps pivotably rotate about a stationary pivot so that their first edges are adjacent to the outer surface of the engine cowling effectively blocking the gas flow in the annular duct. A plurality of thrust reverser baffle portions are supported by the stationary structure and are covered by the flaps during the forward thrust position, and during the reverse thrust position, the thrust reverser baffle portions are within the passageway such that the thrust reverser baffle portions redirect the gas flow deflected by the flaps in a reverse thrust direction.

A turbofan thrust reverser according to the invention enables efficient forward and reverse thrust performances without incurring the drawbacks of the known designs. The plurality of thrust reverser baffle portions comprise two types: a stationary baffles portion and at least one movable baffle portion. The plurality of thrust reverser baffle portions are radially offset and substantially parallel in both the forward and reverse thrust positions. The stationary baffle portion is connected by a first end to the stationary structure and a second end is located downstream the stationary structure. The at least one movable baffle portion is movable with respect to the stationary baffle portion, and in the reverse thrust position, the at least one moveable baffle portion is displaced downstream so that the plurality of baffle portions are longitudinally juxtaposed.

BRIEF DESCRIPTION OF THE DRAWINGS

FIG. 1 is a partial, longitudinal, cross-sectional view illustrating a thrust reverser with a rigidly mounted flow deflecting baffle in the forward thrust position;

FIG. 2 is a partial, longitudinal, cross-sectional view illustrating a thrust reverser with a rigidly mounted flow deflecting baffle in the reverse thrust position; FIG. 3 is a partial, longitudinal, cross-sectional view illustrating a thrust reverser with a plurality of flow deflecting baffles in the forward thrust position;

FIG. 4 is a partial, longitudinal, cross-sectional view illustrating a thrust reverser with a plurality of flow deflecting baffles in the reverse thrust position.

DETAILED DESCRIPTION OF PREFERRED EMBODIMENTS OF THE INVENTION

Figure 5:
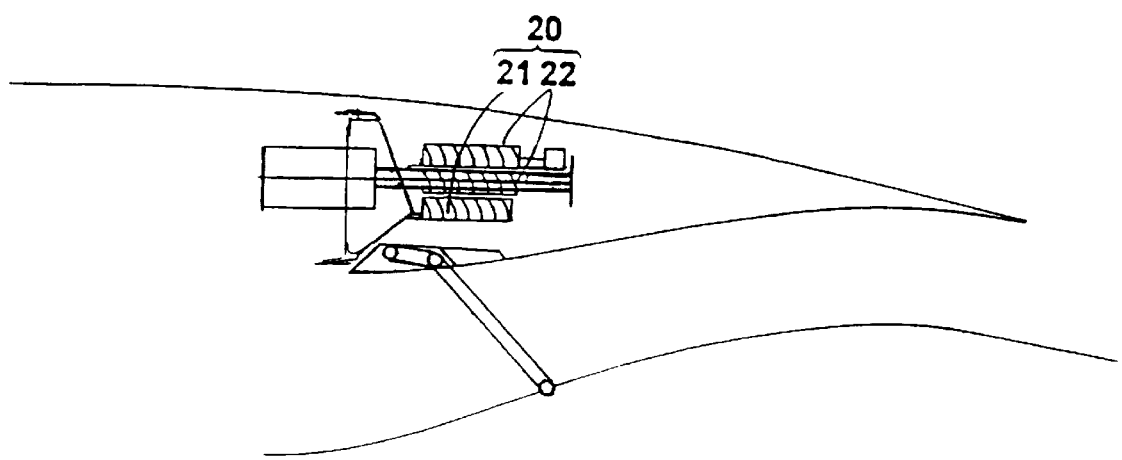
FIG. 5 is a further partial, longitudinal cross-sectional view illustrating another thrust reverser with a plurality of flow deflecting baffles in the forward thrust position.

In the embodiment illustrated in FIGS. 3 and 4, the principal difference from Figs. 10 1 and 2 is that there is a plurality of thrust reverser baffle portions (20). The plurality of flow deflecting baffles comprise two portions: stationary baffle portion (21) and at least one movable baffle portion (22). Two movable baffle portions are illustrated as an example. In both the forward and reverse thrust positions, the stationary baffle portion (21) and the movable baffle portions (22) are substantially parallel to one another. The 1 5 stationary baffle portion (21) has a first end rigidly connected to an upstream edge of the stationary structure (6), whereas the movable baffle portions (22) are axially movable by a displacement mechanism (4). The displacement mechanism (4) comprises a linear actuator that has, in known fashion, an extendible and retractable rod attached to the displaceable structure (7).

When in a forward thrust position, illustrated in FIG. 3, the stationary baffle portion (21) and the at least one movable are housed within the displaceable structure (7) whereat the movable baffle portions (22) are radially below or inward the stationary baffle portion (21). When moving to the reverse thrust position from the forward position, illustrated in FIG. 4, the displacement mechanism (4) axially displaces the 25 displaceable structure (7) downstream while also moving each movable baffle portion (22) downstream so that the plurality of flow deflecting baffles (20) are longitudinally juxtaposed. The displacement of the at least one movable baffle portion (22) in connection with the stationary baffle portion (21) is configured so that the passageway is covered by the plurality of baffle portions. As the annular duct (16) is blocked by the flap (12) in the reverse thrust mode, the gas flow (5) is deflected and redirected by the plurality of baffles (20).

Although the thrust reverser is illustrated in FIGS. 3 and 4 as comprising two movable baffle portions radially offset with respect to the stationary baffle portion and with one another, the number of movable baffle portions may vary in accordance with each particular application on a specific aircraft. Variations of the disclosed embodiment are also possible without departing from the scope of the invention. For instance, as shown in FIG. 5, the movable baffle portions (22) may be located radially outward from the stationary baffle portion (21).

We claim:

1. A thrust reverser for a bypass turbojet-engine comprising:
    a stationary structure defining an upstream part of a fan cowling;
    an axially displaceable, annular structure (7) located downstream of the stationary structure which forms a downstream external part of the fan cowling and a downstream part of a radial inner surface spaced from an outer surface of an engine cowling (16) therebetween so as to form an annular gas flow duct (17);
    a plurality of flaps (12) having a first edges and forming a portion of the inner surface of the displaceable structure (7) during a forward thrust position and a reverse thrust position wherein the flaps (12) pivotably rotate about a stationary pivot (15) wherein the first edges are connected to the outer surface of the engine cowling (16) so as to deflect a gas flow in the annular duct;
    a plurality cascade portions (20) supported by stationary structure (6) and covered by the flaps (12) during a forward thrust position and a reverse thrust position wherein the cascade portions are located between the movable cowling (7) and the stationary structure (6) such that the cascade portions redirect the gas flow deflected by the flaps into a reverse thrust direction;
    a stationary cascade portion (21) having a second edge rigidly connected to the stationary structure (6) and a first end downstream the stationary structure (6); and
    at least one movable cascade portion (22) having a second end and a movable with respect to the stationary cascade portion (21) between a forward thrust position wherein the second end is adjacent to the first end of stationary cascade portion (21) and a reverse thrust position wherein the second end is displaced downstream from the first end so that the plurality of cascade portions are radially offset and longitudinally juxtaposed, the at least one movable cascade portion located substantially parallel to the stationary cascade portion in both the forward and reverse thrust positions.

2. The thrust reverser of claim 1 further comprising a movement mechanism connected on the stationary structure (6) and the displaceable structure (7) for moving the displaceable structure (7), the at least one movable cascade portion (22) and the flaps (12) between the forward and reverse thrust positions.

3. The thrust reverser of claim 2 wherein the movement mechanism comprises an actuating cylinder having an extendible and a retractable rod.

4. The thrust reverser of claim 1 wherein the at least one movable cascade portion (22) is located radially below the stationary cascade portion (21) in the forward thrust position.

5. The thrust reverser of claim 1 wherein the at least one movable cascade portion (22) is located radially above the stationary cascade portion (21) in the forward thrust position.

* * * * *

UNITED STATES PATENT AND TRADEMARK OFFICE
CERTIFICATE OF CORRECTION

PATENT NO.     : 6,256,980 B1
DATED          : July 10, 2001
INVENTOR(S)    : Lecordix et al.

It is certified that error appears in the above-identified patent and that said Letters Patent is hereby corrected as shown below:

<u>Title page, Item [54] and Column 1, lines 1 and 2,</u>
Should read -- THRUST REVERSER WITH MUTUALLY CONFIGURABLE BAFFLES --.

<u>Column 2,</u>
Line 48, delete "10".
Line 55, delete "1".
Line 56, delete "5".

<u>Column 3,</u>
Line 3, delete "25".

Signed and Sealed this

Twenty-first Day of January, 2003

JAMES E. ROGAN
*Director of the United States Patent and Trademark Office*